(12) United States Patent
Bonomo et al.

(10) Patent No.: US 6,948,020 B1
(45) Date of Patent: Sep. 20, 2005

(54) METHOD AND SYSTEM FOR INCREASING CONTROL INFORMATION FROM GPIOS

(75) Inventors: Ralph Bonomo, Kingston, NY (US); Daryl Carvis Cromer, Apex, NC (US); Joseph Michael Pennisi, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 09/677,314

(22) Filed: Sep. 29, 2000

(51) Int. Cl.[7] ............................................. G06F 13/00
(52) U.S. Cl. ...................... 710/300; 710/301; 710/302; 710/303
(58) Field of Search ................................ 710/300, 301, 710/302, 303

(56) References Cited

U.S. PATENT DOCUMENTS

| | | | | |
|---|---|---|---|---|
| 5,210,855 A | * | 5/1993 | Bartol ........................ 710/303 |
| 5,269,011 A | * | 12/1993 | Yanai et al. ................ 710/303 |
| 5,376,831 A | * | 12/1994 | Chen ....................... 307/296.1 |
| 5,386,567 A | * | 1/1995 | Lien et al. .................. 710/303 |
| 5,579,491 A | * | 11/1996 | Jeffries et al. .............. 710/301 |
| 5,930,496 A | * | 7/1999 | MacLaren et al. ............ 703/23 |
| 6,092,134 A | * | 7/2000 | Chun et al. .................. 710/303 |
| 6,170,029 B1 | * | 1/2001 | Kelley et al. ................ 710/302 |
| 6,229,334 B1 | * | 5/2001 | Kelley et al. .................. 326/30 |
| 6,434,653 B1 | * | 8/2002 | Winston ..................... 710/303 |
| 6,438,638 B1 | * | 8/2002 | Jones et al. ................. 710/301 |
| 6,529,967 B1 | * | 3/2003 | Robertson ..................... 710/16 |

* cited by examiner

*Primary Examiner*—Tim Vo
(74) *Attorney, Agent, or Firm*—Sawyer Law Group LLP; Charles Bustamante

(57) ABSTRACT

Aspects for increasing control information from a single general purpose input/output (GPIO) mechanism are described. The aspects include utilizing a single GPIO mechanism with a socket on a computer system. Determinations of whether a first card, a second card, or no card is installed in the socket occur according to detected changes in signal states on a single signal line between the GPIO mechanism and the socket. Detection of a first state on the single signal line indicates presence of a first card in the socket, while detection of a second state on the single signal line indicates presence of a second card in the socket. Detection of a state change on the single signal line indicates no card presence in the socket, where the changes occur in response to signals sent by a POST (power-on self test) routine to the GPIO mechanism.

19 Claims, 1 Drawing Sheet

US 6,948,020 B1

METHOD AND SYSTEM FOR INCREASING CONTROL INFORMATION FROM GPIOS

FIELD OF THE INVENTION

The present invention relates to general purpose input/output mechanisms (GPIOs), and more particularly to increasing control information from single GPIOs.

BACKGROUND OF THE INVENTION

A trend emerging in computer system development and manufacturing involves a move toward a building block-based approach, where a system is created by a collection of building blocks. This approach places increasing need on the ability to detect, enable/disable, and customize building blocks to create the desired personality of the system.

The flexibility of varying the system configuration through building blocks requires that the POST (power-on self test) of the planar be able to detect, enable/disable, and configure the various options installed. This is frequently handled with the use of General Purpose Input Outputs (GPIOs). Typically, a GPIO can only detect two states (high/low) and is dedicated to a function or a particular device. For example, if a particular card is installed, the GPIO may detect a low state, while if the card is not installed, the GPIO may detect a high state.

The push to a building block model is rapidly increasing the need for GPIOs to assist in the detection of the building blocks installed. However, some systems have to limit the number of GPIOs due to other design considerations. Thus, a need exists for a manner of increasing the amount of control information from GPIOs without increasing the number of GPIOs.

The present invention addresses such a need.

SUMMARY OF THE INVENTION

Aspects for increasing control information from a single general purpose input/output (GPIO) mechanism are described. The aspects include utilizing a single GPIO mechanism with a socket on a computer system. Determinations of whether a first card, a second card, or no card is installed in the socket occur according to detected changes in signal states on a single signal line between the GPIO mechanism and the socket. Detection of a first state on the single signal line indicates presence of a first card in the socket, while detection of a second state on the single signal line indicates presence of a second card in the socket. Detection of a state change on the single signal line indicates no card presence in the socket, where the changes occur in response to signals sent by a POST to the GPIO mechanism.

Through the present invention, an increase in the amount of control/information that is available using GPIOs is achieved in a straightforward and effective manner without increasing the number of GPIOs. Further, trinary states on a single signal line are detectable quite readily with the inclusion of an R-C circuit on the single signal line. These and other advantages of the aspects of the present invention will be more fully understood in conjunction with the following detailed description and accompanying drawings.

The present invention relates to increasing control information of single general purpose input/outputs (GPIOs). The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
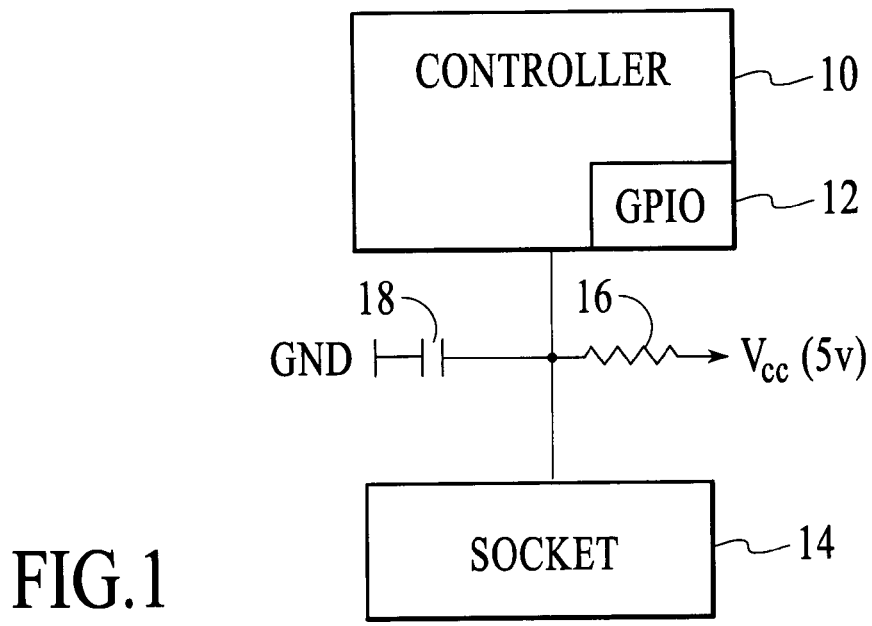
FIG. 1 illustrates a block diagram of a portion of a computer system planar with a GPIO (general purpose input/output) in accordance with the present invention.

Referring now to FIG. 1, a block diagram of a portion of a planar is illustrated and includes a controller 10 which contains a GPIO 12. The GPIO 12 is coupled to a socket 14. As an exemplary embodiment of the functionality of the present invention, suppose the planar supports two different daughter cards, e.g., daughter card 1, daughter card 2, where daughter card 1 and daughter card 2 contain the same chips with minor changes in discrete logic. Thus, the POST needs to know the status of card installation in socket 14, i.e., whether daughter 1, daughter 2, or no card is installed.

Under traditional operations, GPIOs follow Boolean logic (e.g., 0-low, 1-high) which allows for two states (True/False). Thus, the ability to detect three card states, i.e., whether a first card, a second card, or no card is installed, would require two GPIOs. A first GPIO, e.g., GPIO1, would be connected to a detect pin on daughter card 1, with the installed daughter card 1 grounding the detect pin. A second GPIO, e.g., GPIO2, would be connected to a detect pin on daughter card 2, with the installed daughter card 2 grounding that detect pin. When a POST routine of a controller reads the first and second GPIOs, a low for GPIO1 indicates that the first card is installed, a low on GPIO2 indicates that the second card is installed, and a high for both GPIO1 and GPIO2 indicates that no card is installed.

In contrast to the traditional operation requiring the use of two GPIOs for detection of three separate states, in accordance with the present invention, a third logical state (changeable) is created for a single GPIO, which is used to relay information. The changeable state is created with an R-C (resistor-capacitor circuit) on the GPIO to create a transient storage that allows POST to alter the state of the GPIO, as described in further detail hereinbelow. By way of example, the R-C circuit includes resistor 16, e.g., 500 meg ohms, and capacitor 18, e.g., 200 micro farads, as the transient storage mechanism.

Figure 2:
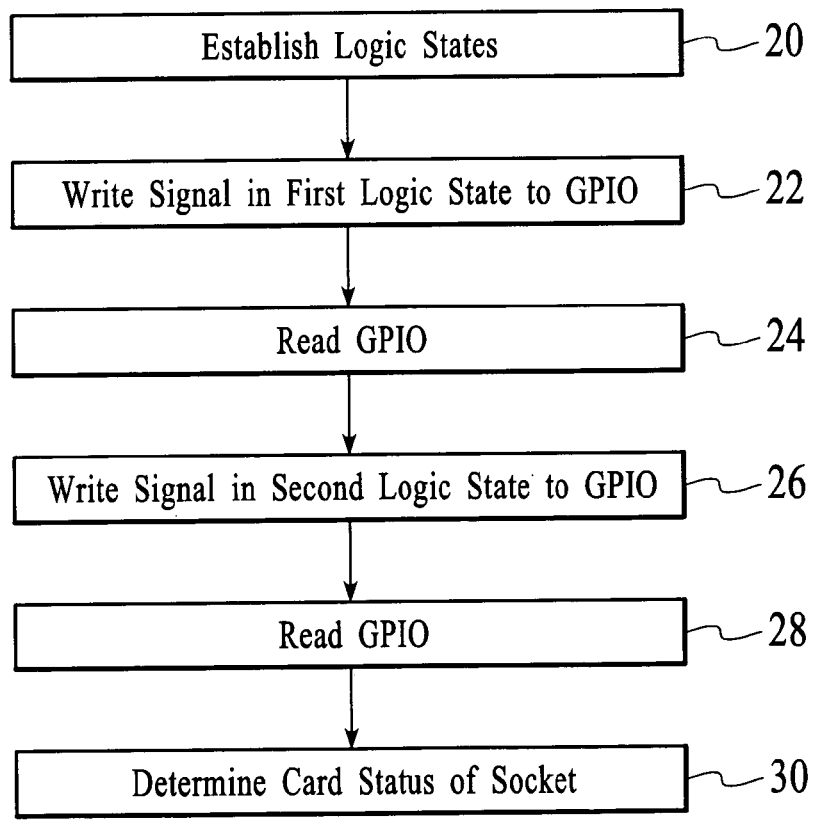
FIG. 2 illustrates a block flow diagram of a method that achieves the ability to increase the control information provided by a single GPIO in accordance with the present invention.

FIG. 2 illustrates a flow chart of a method that achieves the ability one skilled in the art can adjust values to meeting timing requirements to increase the control information provided by a single GPIO, such as to detect installation of either of two card types or installation of no card, in accordance with the present invention. The process includes establishing a logic state associated with installation of each card (step 20). For example, when the GPIO 12 is connected to a detect pin on daugther card 1, daugther card 1 grounds the detect pin (logic low state) when installed in socket 14, while when the GPIO 12 is connected to a detect pin on daugther card 2, daugther card 2 pulls-up the detect pin (logic high state) when installed in socket 14. POST then performs reads and writes to determine if GPIO 12 is state changeable. Thus, POST writes GPIO 12 with a first logic level signal, e.g., a low signal (step 22) and then reads GPIO 12 (step 24). POST writes GPIO 12 with a second logic level signal, opposite to the first logic level signal, e.g., a high signal (step 26). POST again reads GPIO 12 (step 28). The card installation status is then determined by POST (step 30), where if the GPIO 12 is changeable, then no card is installed, if GPIO 12 is low, daugther card 1 is installed, and if GPIO 12 is high, daugther card 2 is installed.

The ability to detect these three states via the single GPIO relies on the fact that the GPIO is held low (pull-down) or held high (pull-up) by the daugther card installed, regardless of whether POST writes a Low/High, because when a device is installed the pull-up/pull-down will dominate. Thus, when POST reads the GPIO, the GPIO will always indicate the value forced by the pull up/down of the card type installed. If the GPIO is state changeable, when there is not a pull-up/pull-down due to the presence of a device in the socket, then POST will be able to read what was written. In this manner, three information states are able to be determined from a single signal line.

Although the present invention has been described in accordance with the embodiments shown, one of ordinary skill in the art will readily recognize that there could be variations to the embodiments and those variations would be within the spirit and scope of the present invention. For example, the same approach could be used for jumper pins to provide configuration information to POST, e.g., Jumper Low, Jumper High, no Jumper. Accordingly, many modifications may be made by one of ordinary skill in the art without departing from the spirit and

What is claimed is:

1. A method for increasing control information from a single general purpose input/output (GPIO) mechanism, the method comprising:
   utilizing a single GPIO mechanism with a socket on a computer system; and
   determining whether a first card, a second card, or no card is installed in the socket according to detected changes in signal states on a single signal line between the GPIO mechanism and the socket.

2. The method of claim 1 wherein determining further comprises writing a signal in a first state by a POST (power-on self test) routine to the GPIO mechanism.

3. The method of claim 2 wherein determining further comprises reading a state of the GPIO mechanism by the POST routine.

4. The method of claim 3 wherein determining further comprises writing the signal in a second state by the POST routine to the GPIO mechanism.

5. The method of claim 4 further comprising reading a state of the GPIO mechanism by the POST routine.

6. The method of claim 5 wherein when the state of the GPIO mechanism changes in accordance with state changes by the POST routine, no card is installed in the socket.

7. The method of claim 6 wherein when the state of the GPIO mechanism does not change, one of the first and second cards is installed.

8. The method of claim 7 wherein one of the first and second cards pulls-up the signal line, and the other of the first and second cards pulls-down the single signal line.

9. A system for increasing control information from a single general purpose input/output (GPIO) mechanism, the system comprising:
   a computer system planar including a socket; and
   a GPIO means coupled to the socket via a single signal line, wherein at least three states of occupancy of the socket are detected according to state changes on the single signal line.

10. The system of claim 9 wherein when a first card occupies the socket, the single signal line is pulled to a first logic state.

11. The system of claim 10 wherein when a second card occupies the socket, the single signal line is pulled to a second logic state.

12. The system of claim 11 wherein when no card occupies the socket, the single signal line changes state in response to state changes of a signal from a POST (power-on self test) routine.

13. The system of claim 12 further comprising a controller coupled to the GPIO to perform the POST routine.

14. The system of claim 13 further comprising a transient storage circuit coupled to the single signal line to assist in the detection of state changes.

15. The system of claim 14 wherein the transient storage circuit comprises a resistor-capacitor (R-C) circuit.

16. A method to allow trinary state determination from a single signal line, the method comprising:
   providing a GPIO (general purpose input/output) mechanism for a socket on a computer system planar; and
   utilizing a transient storage circuit on a signal line between the GPIO mechanism and the socket to allow detection of at least three separate conditions of the socket.

17. The method of claim 16 wherein utilizing a transient storage circuit further comprises utilizing an R-C (resistor-capacitor) circuit.

18. The method of claim 17 wherein utilizing an R-C circuit further comprises detecting a first state on the signal line indicating presence of a first card in the socket, detecting a second state on the signal line indicating presence of a second card in the socket, and detecting a state change on the signal line indicating no card presence in the socket.

19. The method of claim 18 wherein detecting the first state, the second state, and the state change further comprises detecting whether state of the signal line changes in response to signals sent by a POST (power-on self test) routine to the GPIO mechanism.

* * * * *